(12) United States Patent
Tomii (10) Patent No.: US 11,418,667 B2
(45) Date of Patent: Aug. 16, 2022

(54) IMAGE READING APPARATUS AND IMAGE FORMING APPARATUS

(71) Applicant: CANON KABUSHIKI KAISHA, Tokyo (JP)

(72) Inventor: Taishi Tomii, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/345,310

(22) Filed: Jun. 11, 2021

(65) Prior Publication Data
US 2021/0409564 A1 Dec. 30, 2021

(30) Foreign Application Priority Data

Jun. 29, 2020 (JP) ............................. JP2020-111820

(51) Int. Cl.
*H04N 1/04* (2006.01)
*H04N 1/00* (2006.01)

(52) U.S. Cl.
CPC ..... *H04N 1/00745* (2013.01); *H04N 1/00713* (2013.01); *H04N 1/00724* (2013.01); *H04N 1/00748* (2013.01)

(58) Field of Classification Search
CPC ........... H04N 1/00745; H04N 1/00713; H04N 1/00724; H04N 1/00748
USPC ........................................ 358/449, 488, 497
See application file for complete search history.

(56) References Cited

U.S. PATENT DOCUMENTS

| 8,270,042 | B2 | 9/2012 | Ishido | |
|---|---|---|---|---|
| 10,334,137 | B2 | 6/2019 | Noro | |
| 2004/0174572 | A1* | 9/2004 | Park | H04N 1/00713 358/497 |
| 2014/0118796 | A1* | 5/2014 | Isaev | H04N 1/00748 358/448 |
| 2017/0155785 | A1* | 6/2017 | Mizude | H04N 1/00734 |

FOREIGN PATENT DOCUMENTS

JP 2006067330 A 3/2006

* cited by examiner

*Primary Examiner* — Cheukfan Lee
(74) *Attorney, Agent, or Firm* — Rossi, Kimms & McDowell LLP (57) ABSTRACT

An image reading apparatus includes a transparent member on which an original is placed, a reading unit configured to read the original placed on the transparent member while moving in a first direction, and at least one processor configured to detect at least one edge of the original based on a reading result by the reading unit, wherein the at least one processor is configured to determine a candidate of a size of the original placed on the transparent member based on an edge, among the at least one detected edge, in the second direction orthogonal to the first direction, wherein the reading unit is configured to move in the first direction by a predetermined distance based on the candidate of the determined size.

12 Claims, 7 Drawing Sheets

| ORIGINAL SIZE | MAIN SCANNING DIRECTION | SUB-SCANNING DIRECTION |
|---|---|---|
| A 5 | 210mm | 148mm |
| A 4 | 297mm | 210mm |
| A 4 R | 210mm | 297mm |
| A 3 | 297mm | 420mm |

IMAGE READING APPARATUS AND IMAGE FORMING APPARATUS

BACKGROUND OF THE INVENTION

Field of the Invention

The present invention relates to an image reading apparatus which determines a size of an original placed on a platen, and an image forming apparatus which forms an image on a sheet based on the determined size.

Description of the Related Art

An image reading apparatus has a reading unit which irradiates an original with light from a light source to read the reflected light with an image sensor to read original images such as an image or characters recorded (or printed, etc.) on the original. The image reading apparatus sends image data representing a read original image to an image forming apparatus when it is connected to the image forming apparatus which prints an image on a sheet. The image forming apparatus copies the original image by performing image forming based on the image data obtained from the image reading apparatus.

Such the image reading apparatus has a platen which is configured with a transparent member. The original is placed such that a surface on which the original image is formed faces the platen. The reading unit reads the original image by irradiating, with the reading unit moving in a direction, the original with light from a light source via the platen, and receiving, with an image sensor, the light reflected from the original via the platen. The image sensor is configured by arranging light receiving elements in a line. The direction in which the reading unit moves is a direction orthogonal to the line of the light receiving elements. The direction of the line of the light receiving elements is a main scanning direction, and the direction of movement of the reading unit is a sub-scanning direction.

The image reading apparatus has a configuration in which the size of the original placed on the platen is detected by the reading unit. U.S. Pat. No. 8,270,042 discloses a technology to detect the size of the original based on an output of an image sensor obtained in a state in which light is not irradiated from a light source and an output of the image sensor obtained in a state in which light is irradiated from the light source. Japanese Patent Application Laid-open No. 2006-67330 discloses a technique for detecting the size of the original by setting seven detection positions in a predetermined region of the platen to detect presence or absence of the original at these detection positions. U.S. Pat. No. 10,334,137 discloses a technique for detecting a shadow of an edge of an original from image data to determine a position of the edge of the original in a main scanning direction and a sub-scanning direction.

In U.S. Pat. No. 8,270,042 and Japanese Patent Application Laid-open No. 2006-67330, the size of the original on the platen is detected in a state where the original is on the platen and a corner of the original abuts against a reference position of the platen. However, in the image reading apparatus, the image of the original may be read in a state where the corner of the original is not abutted at the reference position of the platen. In this case, the size of the original cannot be determined accurately. Therefore, in order to determine the size of the original, the image reading apparatus needs to read the original image with the reading unit moving in the sub-scanning direction to detect positions of both ends of the original in the main scanning direction and positions of both ends of the original in the sub-scanning direction.

The image forming apparatus determines, based on the information regarding the size of the original notified from the image reading apparatus, the size of the sheet on which the image is formed to start feeding the sheet which the size is determined. Therefore, the longer the time between the input of the instruction to start copying and the determination of the size of the original, the longer the First Copy Out Time (FCOT). That is, the productivity of the image forming apparatus decreases. Therefore, there is a demand for a configuration for decreasing the time required to determine the size of the original in a state in which the corner is not abutted against the reference position of the platen.

SUMMARY OF THE INVENTION

An image reading apparatus according to the present disclosure includes: a transparent member on which an original is placed; a reading unit configured to read the original placed on the transparent member while moving in a first direction; and at least one processor configured to detect at least one edge of the original based on a reading result by the reading unit, wherein the at least one processor is configured to determine a candidate of a size of the original placed on the transparent member based on an edge, among the at least one detected edge, in the second direction orthogonal to the first direction, wherein the reading unit is configured to move in the first direction by a predetermined distance based on the candidate of the determined size, and wherein the at least one processor is configured to determine the size of the original based on whether a trailing edge in the first direction is detected or not based on the reading result read by the reading unit while moving by the predetermined distance.

Further features of the present invention will become apparent from the following description of exemplary embodiments (with reference to the attached drawings).

DESCRIPTION OF THE EMBODIMENTS

In the following, an embodiment of the present invention is described in detail with reference to the accompanying drawings.

<Image Forming Apparatus>

Figure 1:
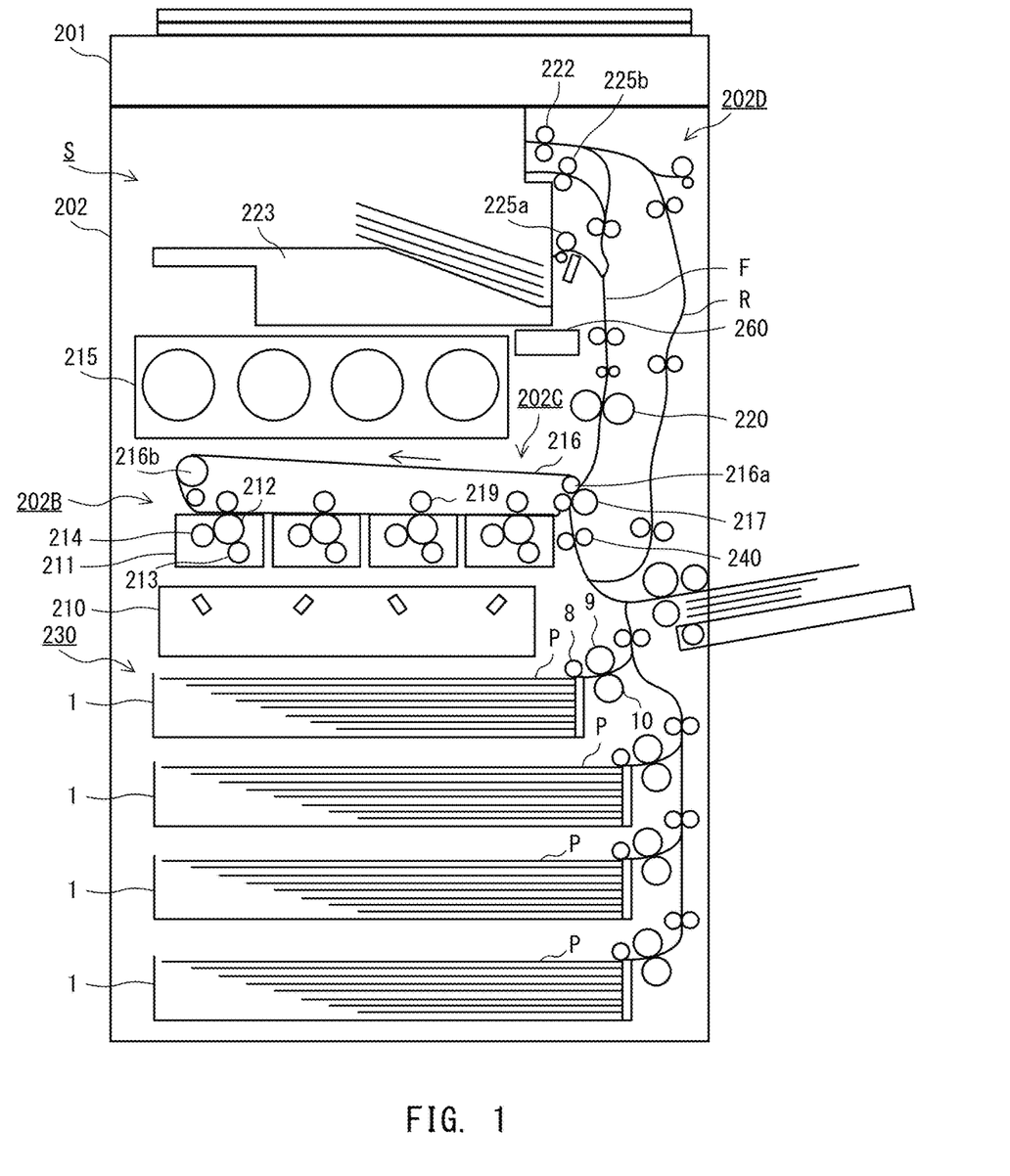
FIG. 1 is a configuration diagram of an image forming apparatus having an image reading apparatus.

FIG. 1 is a configuration diagram of an image forming apparatus having an image reading apparatus of the present embodiment. The image forming apparatus 202 of the present embodiment is a color printer. The image forming apparatus 202 is a four-drum printer using an intermediate transfer belt 216. The image forming apparatus 202 includes, in its housing, an image forming unit 202B, a sheet feeding unit 230, and a control unit 260. The image forming unit 202B forms an image on a sheet P fed by the sheet feeding unit 230. The image reading apparatus 201 is provided on an upper part of the housing of the image forming apparatus 202. The image reading apparatus 201 reads an image of the original and transmits the reading result to the image forming apparatus 202. Further, the image reading apparatus 201 detects the size of the original and notifies the image forming apparatus 202 of the same. A discharge space S is formed between the image reading apparatus 201 and the image forming apparatus 202. A sheet P on which image forming is performed is discharged into the discharge space S. The control unit 260 controls an image forming operation and a sheet feeding operation and the like performed by the image forming apparatus 202.

The image forming unit 202B includes a laser scanner 210, four process cartridges 211 for forming a toner image of four colors of yellow (Y), magenta (M), cyan (C), and black (K), a process cartridge 211, an intermediate transfer unit 202C, and a fixing unit 220. Each process cartridge 211 includes a photosensitive drum 212, a charger 213, and a developer 214. The intermediate transfer unit 202C and the fixing unit 220 are arranged above the four process cartridges 211. Provided above the intermediate transfer unit 202C is a toner cartridge 215 to supply toner to the developer 214.

The intermediate transfer unit 202C includes an intermediate transfer belt 216 which is wound around a secondary transfer inner roller 216a and a tension roller 216b. Inside the intermediate transfer belt 216, a plurality of primary transfer rollers 219 are provided to contact with the intermediate transfer belt 216 at positions facing each photosensitive drum 212. The secondary transfer inner roller 216a serves as a drive roller and is driven by a drive unit (not shown) to rotationally drive the intermediate transfer belt 216 in a direction of an arrow. The primary transfer roller 219 sequentially performs multi-transfer of toner images having negative polarity and formed on respective photosensitive drums 212 onto the intermediate transfer belt 216.

At a position of the intermediate transfer unit 202C facing the secondary transfer inner roller 216a, a secondary transfer outer roller 217 is provided. The secondary transfer outer roller 217 transfers the toner image formed (transferred) on the intermediate transfer belt 216 on the sheet P. The second transfer unit is configured with the secondary transfer inner roller 216a and the secondary transfer outer roller 217. The fixing unit 220 is arranged above the secondary transfer outer roller 217. A first discharge roller pair 225a, a second discharge roller pair 225b, and a two-side reversing portion 202D are arranged above the fixing unit 220. The two-side reversing portion 202D includes a reversing roller pair 222 which can reverse the sheet P, and a re-conveying pass R for conveying the sheet P, on one surface of which an image is formed, to the image forming unit 202B, and the like.

The image forming apparatus 202 having the above configuration operates as follows to form an image on the sheet P. In the following, a description is made for a case where copying operation is performed. When performing the copying operation, at first, the image reading apparatus 201 reads an original image from the original. The image reading apparatus 201 transmits read image data representing the original image and data representing the size of the original to the control unit 260.

Each process cartridge 211 of the image forming unit 202B uniformly charges a surface of the photosensitive drum 212 with a predetermined polarity and potential by the charger 213. The laser scanner 210 irradiates, under control of the control unit 260, the charged surface of the photosensitive drum 212 with the laser beam modulated according to the image data. By irradiating the laser beam, an electrostatic latent image of the color corresponding to the surface of each of the photosensitive drum 212 is formed. The developer 214 develops and visualizes the electrostatic latent image with toners of the corresponding color. Thus, the toner image of the corresponding color is formed on each of the photosensitive drums 212. The toner images of the photosensitive drums 212 are sequentially transferred by superimposing, by primary transfer bias applied to the primary transfer roller 219, on the intermediate transfer belt 216. As a result, a full-color toner image is formed on the intermediate transfer belt 216.

The sheet P on which the image is formed is fed by the sheet feeding unit 230. The sheet feeding unit 230 includes a sheet feeding cassette 1 for storing the sheet P and a conveying portion for conveying the sheet P from the sheet feeding cassette 1. The conveying portion includes a pickup roller 8, a feed roller 9, a retard roller 10, and a registration roller pair 240. In this embodiment, 4 sets of the sheet feeding cassette 1, the pickup roller 8, the feed roller 9, and the retard roller 10 are provided. In each of a plurality of sheet feeding cassettes 1, sheets of different sizes are stored. The sheet feeding unit 230 feeds, from the sheet feeding cassette 1 for storing the sheet, a sheet having a size corresponding to the size of the original notified from the image reading apparatus 201.

The pickup roller 8 feeds the sheet P from the sheet feeding cassette 1 to the sheet conveyance path. The feed roller 9 and the retard roller 10 forms a separation unit which separates and conveys the sheets P fed by the pickup roller 8 one by one by a known separation technique. The sheet P separated one by one is conveyed to the registration roller pair 240. The registration roller pair 240 corrects the skew of the sheet P with respect to the transport direction.

The sheet P is conveyed, after performing the skew correction, to the second transfer unit according to the timing at which the toner image on the intermediate transfer belt 216 is conveyed to the second transfer unit. The toner image is collectively transferred from the intermediate transfer belt 216 on the sheet P conveyed to the second transfer unit by the secondary transfer bias applied to the secondary transfer outer roller 217. The sheet P to which the toner image has been transferred is conveyed to the fixing unit 220. The fixing unit 220 melts and mixes toner of each color by applying heat and pressure to fix the color image on the sheet P. The sheet P on which the image is fixed is discharged from the fixing unit 220 to a lower area of the discharge space S by one of the first discharge roller pair 225a and the second discharge roller pair 225b. The sheet P is stacked on the loading unit 223 provided to protrude into the discharge space S. In a case where images are to be formed on both sides of the sheet P, an image is formed on one surface of the sheet P, and the sheet P is conveyed to the re-conveying pass R of the two-side reversing portion 202D by the reversing roller pair 222. Then, the sheet P is again conveyed to the image forming unit 202B to form the other image on the other surface.

<Configuration of Image Reading Apparatus>

Figure 2:
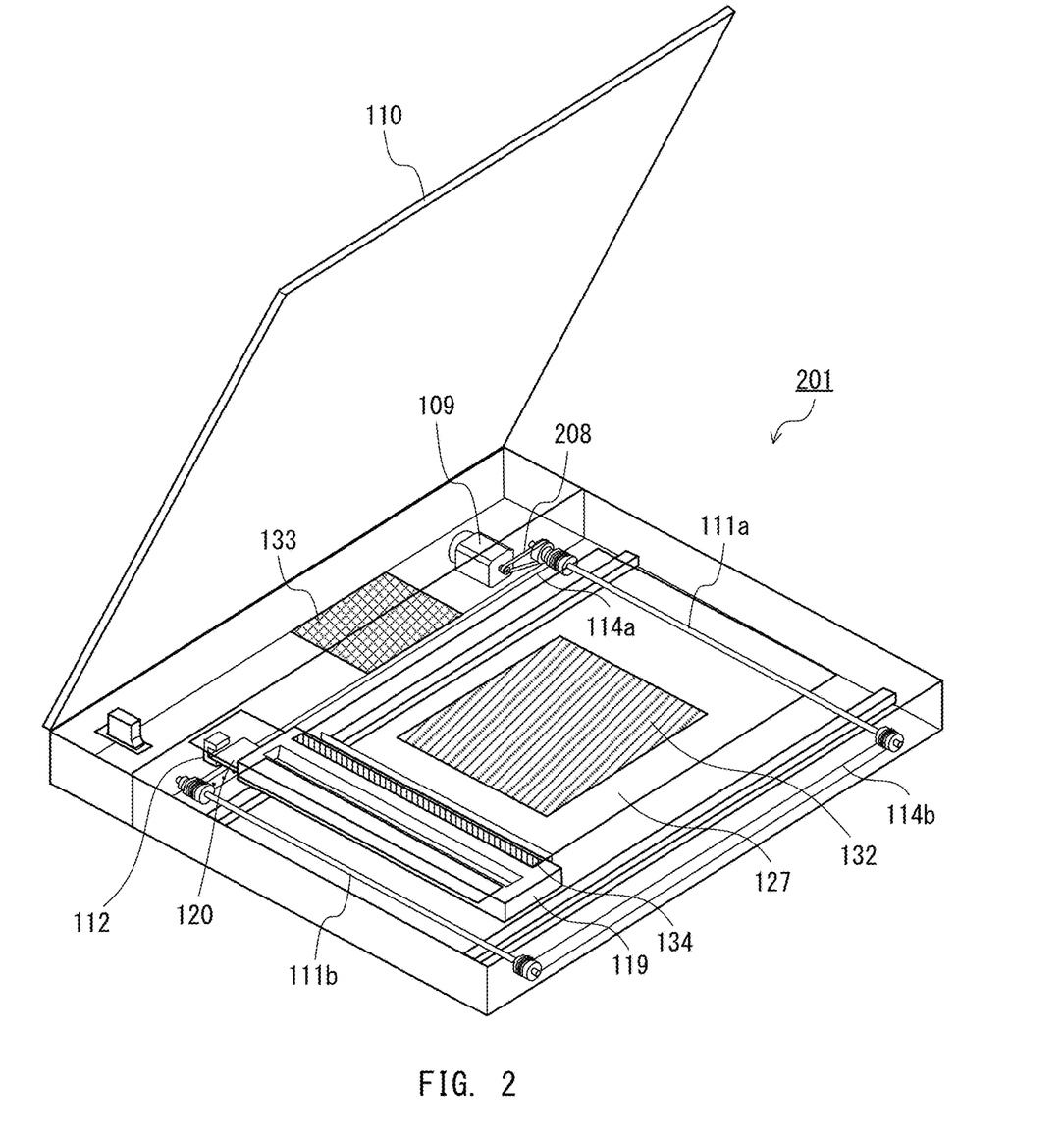
FIG. 2 is a configuration explanatory diagram of the image reading apparatus.

FIG. 2 is a configuration explanatory diagram of the image reading apparatus of the present embodiment. In the image reading apparatus 201, a reading unit 119, which is a line sensor, a motor 109, a home position sensor 112, a shading plate 134, and a control board 133 are installed. In the image reading apparatus 201, a platen 127, which is configured by a transparent member, is provided. The original 132 to be read is placed on the platen 127 with an image reading surface facing toward the platen 127. On the image reading surface, original images such as images or characters are formed. The image reading apparatus 201 is provided with a pressure plate 110. The pressure plate 110 is attached to the platen 127 such that it is openable and closable. The pressure plate 110 suppresses the original 132 placed on the platen 127 in a closed state. The surface of the pressure plate 110 on the platen 127 side is white. The reading unit 119 is a substantially rectangular parallelepiped. The reading unit 119 reads the original image from the original 132 placed on the platen 127 with the longitudinal direction of the original 132 being the main scanning direction.

The motor 109 is a pulse motor such as a stepping motor. The motor 109 transmits a driving force to the drive shaft 111a via a timing belt 208. The drive shaft 111a is connected to the drive shaft 111b via the wires 114a and 114b. The reading unit 119 is fixed to the wires 114a and 114b by a fixing unit (not shown). By rotationally driving the drive shaft 111a by the motor 109, the wires 114a and 114b are rotated, thus the reading unit 119 is moved to a sub-scanning direction orthogonal to the main scanning direction. When reading an original image of the original 132 on the platen 127, the reading unit 119 reads the original image one line at a time in the main scanning direction with the reading unit 119 moving in the sub-scanning direction.

The reading unit 119 is provided with a flag 120 on a wire 114a side. The home position sensor 112 detects the flag 120 when the reading unit 119 is in a home position. The control board 133 obtains the detection result of the home position sensor 112 to control driving of the motor 109 based on the obtained detection result. The shading plate 134 is a reference member for shading the reading unit 119 before starting to read the original 132. When performing shading, the reading unit 119 moves the shading plate 134 to a readable position to read the shading plate 134. The control board 133 performs shading based on the reading result of the shading plate 134.

<Control System>

Figure 3:
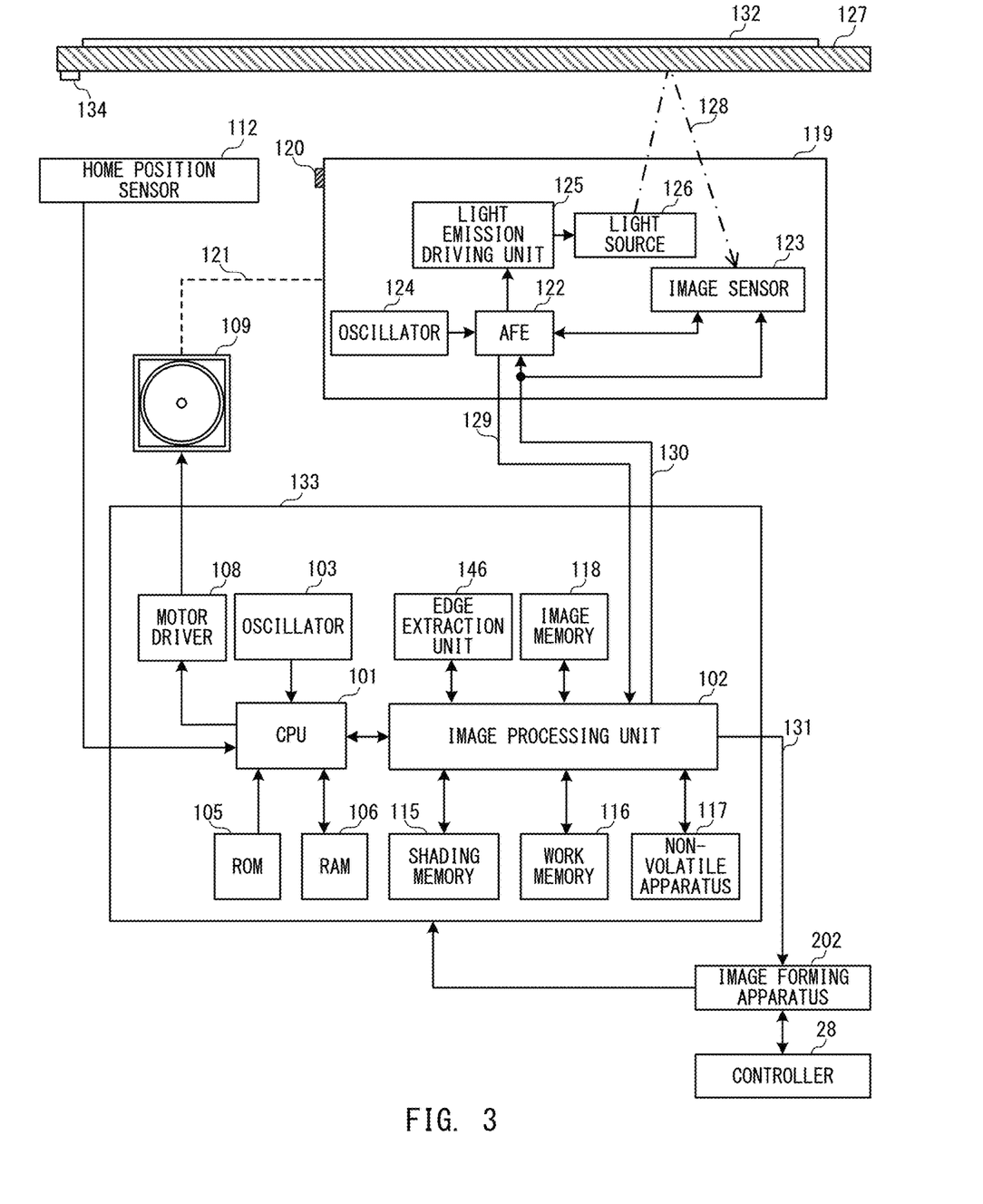
FIG. 3 is an explanatory diagram of a control system.

FIG. 3 is an explanatory diagram of a control system of the image reading apparatus 201. Hereinafter, the control of the motor 109 and the reading unit 119 by the control board 133 will be described. The control board 133 is a controller which controls the operation of the reading unit 119.

The control board 133 is an information processing apparatus including a CPU (Central Processing Unit) 101, a ROM (Read Only Memory) 105, and a RAM (Random Access Memory) 106. The CPU 101 activates, by operating a power switch (not shown), the image reading apparatus 201 to execute a control program stored in the ROM 105 to thereby control the operation of the image reading apparatus 201. As a result, information concerning variables, such as various parameters used for control, is developed in the RAM 106. The control board 133 includes an image processing unit 102, a motor driver 108, and an oscillator 103 connected to the CPU 101. The home position sensor 112 is connected to the CPU 101, thus the detection result of the home position sensor 112 can be obtained. The CPU 101 and the image processing unit 102 are connected via a bus.

An edge extraction unit 146, an image memory 118, a shading memory 115, a working memory 116, and a non-volatile memory 117 are connected to the image processing unit 102. The non-volatile memory 117 is, for example, an EEPROM (Electrically Erasable Programmable Read-Only Memory). The image processing unit 102 is connected to the reading unit 119 to generate and output image data based on the reading result obtained by the reading unit 119. The image processing unit 102 and the edge extraction unit 146 may be implemented by hardware, however, they be functional blocks implemented by executing a computer program by the CPU 101. The image memory 118, the shading memory 115, and the working memory 116 may be individual rewritable memories which are separated from the RAM 106. However, they may be respectively provided in a storage area of the RAM 106.

The reading unit 119 includes a light source 126, an image sensor 123, a light emitting drive unit 125, an AFE (Analog Front End) 122, and an oscillator 124. The light source 126 is driven and controlled by the light emitting drive unit 125 to emit light. The light source 126 includes, for example, an LED (Light Emitting Diode), and emits linear light in the main scanning direction. The image sensor 123 is configured by arranging a plurality of light receiving elements in the main scanning direction.

The operation modes and the like of the image sensor 123, the AFE 122, and the light emitting drive unit 125 are set by the image processing unit 102 via a serial communication line 130. Setting values for the operation mode previously is stored in the ROM 105. The image processing unit 102 reads various setting values from the ROM 105 via the CPU 101 when setting the operation mode, and sets the read various setting values for the image sensor 123, the AFE 122, and the light emitting drive unit 125. The operation mode includes, for example, a color mode for reading a color image at the time of reading, and monochrome mode for reading a monochrome image, etc. Further, an instruction to enter the standby state and an instruction to release the standby state are input via the serial communication line 130. The image sensor 123 switches the light receiving state of the light receiving element according to the operation mode. The AFE 122 switches the gain setting value and the like for amplifying the electric signal output from the image sensor 123 according to the operation mode. The set value of the light source 126 is switched such that an amount of emitted light differs depending on the operation mode.

The setting value for the operation mode is read from the ROM 105 when activated, and is stored in the working memory 116. When switching the operation mode, the image processing unit 102 performs various settings for the reading unit 119 according to the setting values stored in the working memory 116. Further, the working memory 116 stores calculation results and various parameters generated by the image processing unit 102 during performing processing.

The reading unit 119 is a drive load for the motor 109. The motor 109 is driven and controlled by the motor driver 108. The motor driver 108 operates according to the instruction of the CPU 101. By driving and controlling the motor 109, the reading unit 119 moves in the sub-scanning direction at a constant speed. The reading unit 119 irradiates the platen 127 with light from the light source 126 under the control of the light emitting drive unit 125 with the reading unit 119 moving in the sub-scanning direction. The light, irradiated by the reading unit 119 with the reading unit 119 moving in the sub-scanning direction, passes through the platen 127 and irradiates the original 132 placed on the platen 127. The reflected light from the original 132 passes through the platen 127. Then, the reflected light is received by the image sensor 123 via an optical system (not shown). The image sensor 123 converts the received the reflected light into an electric signal and outputs the signal.

In this way, the reading unit 119 reads the original 132 one line at a time while moving in the sub-scanning direction at a constant speed, and generates an electric signal which is an analog signal as a reading result. The electric signal is transmitted from the image sensor 123 to the AFE 122. The AFE 122 operates based on the clock signal obtained from the oscillator 124, and performs various processing on the electric signal obtained from the image sensor 123 to generate a digital image signal. The reading unit 119 is adjusted, when the image reading apparatus 201 is activated, such that the reading result (electric signal) of the shading plate 134, which is input from the image sensor 123, is within an input range of the AFE 122.

The reading unit 119 performs, when it is activated, various settings and adjustments for output levels of the image sensor 123. As a result, the activation control of the image sensor 123 takes a longer time than the activation control of the light emitting drive unit 125. Therefore, the reading unit 119 activates the light emitting drive unit 125 after completing the activation of the image sensor 123. The reading unit 119 is configured by a CMOS line sensor, which uses a CMOS sensor as a light receiving element in the image sensor 123, and a CIS (Contact Image Sensor).

The digital image signal generated by the AFE 122 is transmitted to the image processing unit 102 via the signal line 129. The transmission of the digital image signal from the AFE 122 to the image processing unit 102 can be performed by a single end or by a differential signal, however, in the present embodiment, any of them may be used. When the reading unit 119 performs the reading operation while moving in the sub-scanning direction, the reading unit 119 also reads a white portion of the pressure plate 110 as well as the original 132. Therefore, the digital image signal includes a white image as a background as well as the image of the original 132.

The CPU 101 drives and controls the motor 109 according to the detection result of the home position sensor 112. The detection result of the home position sensor 112 changes by detecting the flag 120 of the reading unit 119. From this detection result, the CPU 101 can determine whether or not the reading unit 119 is located at the home position. The CPU 101 determines whether or not the reading unit 119 is located at the home position after activation, and resets the position information of the reading unit 119 when the reading unit 119 is at the home position. The CPU 101 controls the position of the reading unit 119 by the motor 109 with reference to the home position. If the reading unit 119 is not located at the home position after activation, the CPU 101 moves the reading unit 119 while executing other processing, and constantly monitors the detection result of the home position sensor 112. When it is determined from the detection result that the reading unit 119 is located at the home position, the movement of the reading unit 119 is ended and the position information of the reading unit 119 is reset.

The operating speed of the CPU 101 is determined by the clock signal input from the oscillator 103. The CPU 101 generates, based on the clock signal input from the oscillator 103, a motor drive clock for acceleration, deceleration, and constant velocity movement of the reading unit 119, a movement direction control signal, a reference signal for motor phase current control, and the like. The motor driver 108 and the motor 109 perform movement control of the reading unit 119 based on the motor drive clock, the movement direction control signal, the reference signal for motor phase current control, and the like. Therefore, the reading unit 119 controls the position, the moving speed, and the moving direction of the sub-scanning direction.

The image processing unit 102 performs image processing such as shading correction processing on the digital image signal obtained from the reading unit 119 to generate image data. The image data includes image data representing the original image excluding the background and image data representing the original image including the background. In the present embodiment, the image processing unit 102 generates image data including each luminance value of R (red), G (green), and B (blue). As to the image data, a luminance value of each color is set for each pixel. The shading memory 115 is used for calculating correction coefficients and for storing the correction coefficients when executing the shading correction. The non-volatile memory 117 is a backup memory for storing the adjustment value specific to the machine body of the image reading apparatus 201. The image memory 118 can store image data representing the original image excluding the backgrounds for a plurality of pages. The image reading apparatus 201 transmits image data to the control unit 260 of the image forming apparatus 202 via a signal line 131. When the image reading apparatus 201 is used as a scanner, the image data may be transmitted to an external device such as a personal computer or a smartphone.

The operation unit 28 is connected to the image forming apparatus 202. The operation unit 28 is a user interface configured by combining an input interface and an output interface. The input interface includes various keys, a touch panel, and the like. The output interface is a display, a speaker, or the like. The user can give instructions such as an instruction to start a copying operation, an instruction to specify an operation mode, or the like by the operation unit 28.

<Edge Detection>

Figure 4A:
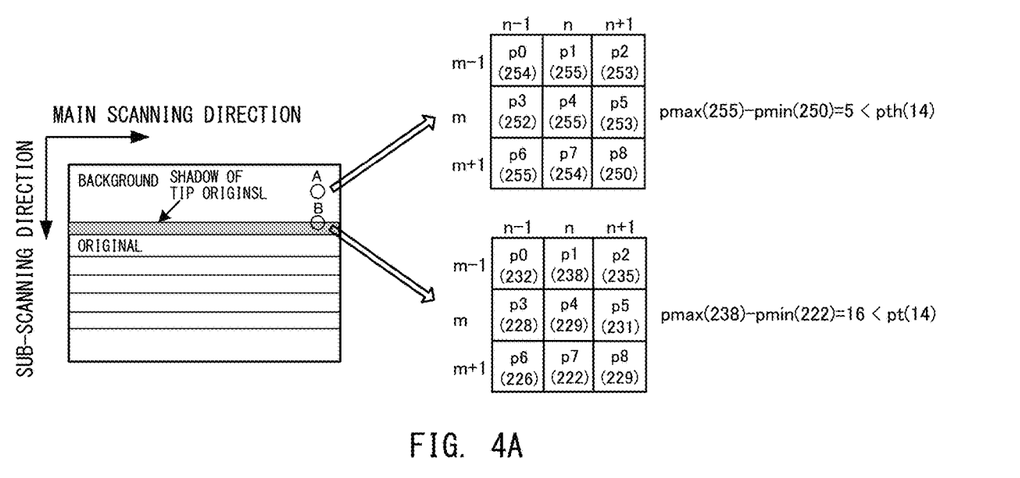
FIG. 4A and FIG. 4B are explanatory diagrams of an extraction process of an edge portion.
Figure 4B:
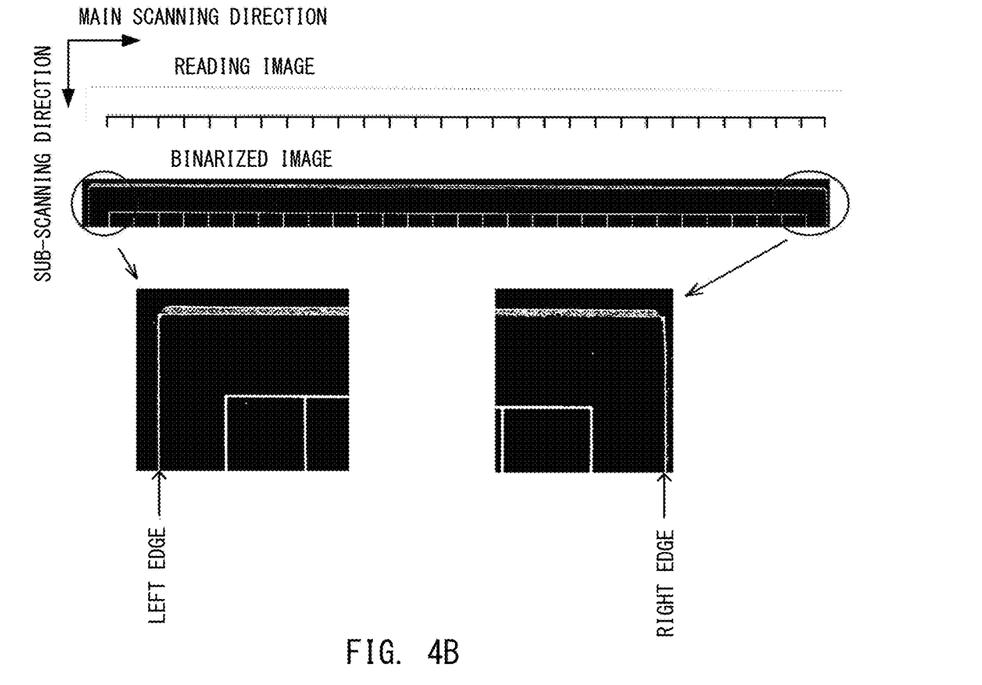

The image data including the background generated by the image processing unit 102 is transmitted to the edge extraction unit 146. The edge extraction unit 146 extracts the edge portion of the original from the image data. The edge extraction unit 146 of the present embodiment extracts the edge portion of the original using the luminance value of G (green) of each pixel included in the image data. FIG. 4A and FIG. 4B are explanatory diagrams of the extraction process of the edge portion by the edge extraction unit 146.

As shown in FIG. 4A, the edge extraction unit 146 performs binarization processing on the image data. In this binarization processing, a region containing a predetermined number of pixels in each of the main scanning direction and the sub-scanning direction is treated as one block. In the present embodiment, the edge extraction unit 146 treats a 9-pixel area of 3 pixels*3 pixels in the main scanning direction and the sub-scanning direction as one block. In FIG. 4A, the pixel position of the main scanning direction is represented by n ($1 \leq n \leq 7486$), and the pixel position of the sub-scanning direction is represented by m ($1 < m$). The luminance value of each pixel is represented by px (x=0 to 8).

The edge extraction unit 146 calculates the difference between the maximum value pmax and the minimum value pmin of the luminance values of 9 pixels in one block. When all 9 pixels in one block are images of the original background (white) at the time of reading the original, as represented by the point A, the difference between the maximum value pmax and the minimum value pmin becomes small. At a boundary between the background (white) and the original, as represented by the point B, the difference between the maximum value pmax and the minimum value pmin is larger than that in point A due to the shadow (gray) of the edge of the original. When the difference between the maximum value pmax and the minimum value pmin is larger than a predetermined threshold value pth (14 in FIG. 4A) (Equation 1), the edge extraction unit 146 determines that 9 pixels of the block include edge pixels. In the present embodiment, the edge extraction unit 146 determines that the pixel in the center of the block (coordinates (n, m)) is an edge pixel.

$$p\text{max} - p\text{min} \geq pth \quad (1)$$

The edge extraction unit 146 sequentially determines such determination of the edge pixels for the pixels included in the image data. However, the edge extraction unit 146 does not determine the edge pixels for the pixels at the positions of (n, m)=(0, 0) and (7487, 0).

In FIG. 4A, one pixel of the image data is represented by 8 bits (luminance value: 0 to 255). FIG. 4B shows the result of extracting edge pixels from the image data. The image data is binarized as a pixel (edge pixel) which satisfies the above (Equation 1) and a pixel that does not satisfy the above (Equation 1). The Edge pixels are represented in white. In this way, the edge extraction unit 146 binarizes the image data obtained from the image processing unit 102, and determines that the shadow generated by the edge of the original as the edge portion of the original. The edge portions are extracted by both the main scanning direction and the sub-scanning direction. The edge portion of the sub-scanning direction which is first detected after the start of reading the original is called the tip edge. The edge portions at both ends of the main scanning direction are detected when the edge portion of the sub-scanning direction is detected. By detecting the edge portion at both ends of the main scanning direction, the size of the main scanning direction of the original can be specified.

<Detection of Size of Original>

Figure 5:
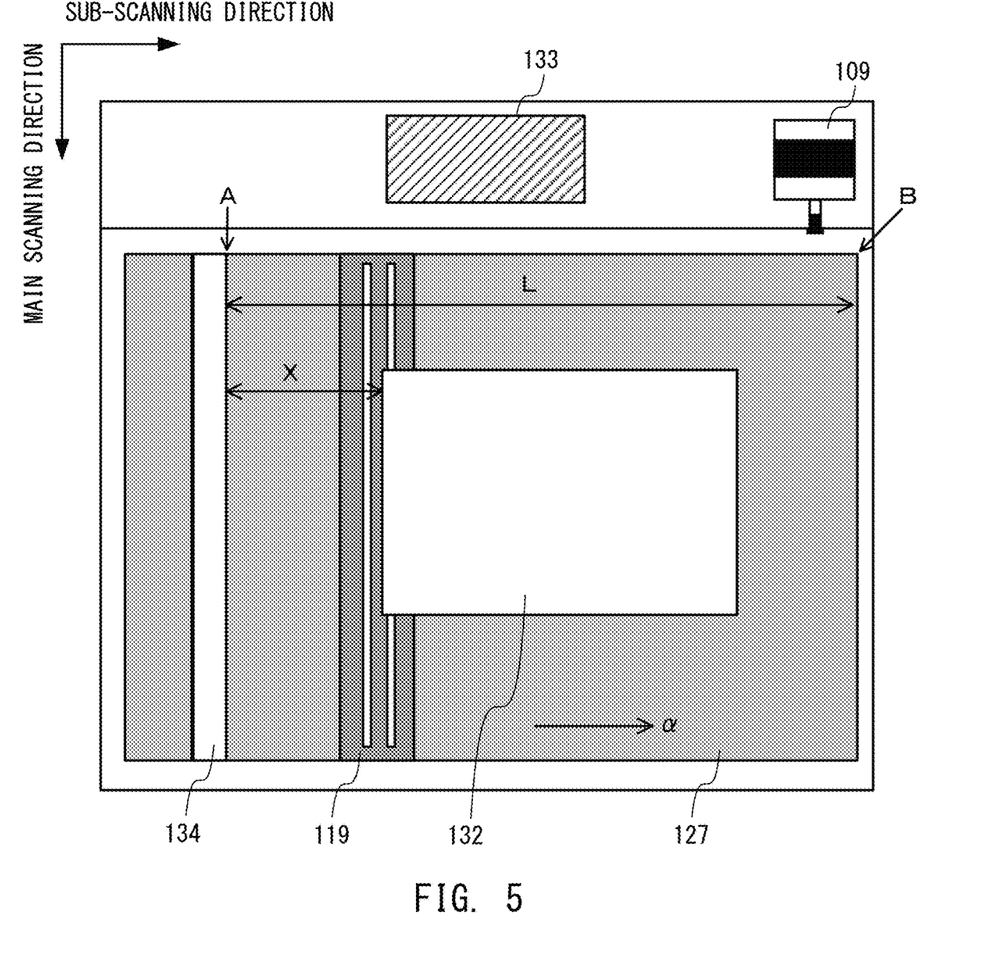
FIG. 5 is an explanatory diagram of a method of detecting a size of an original.
Figure 6:
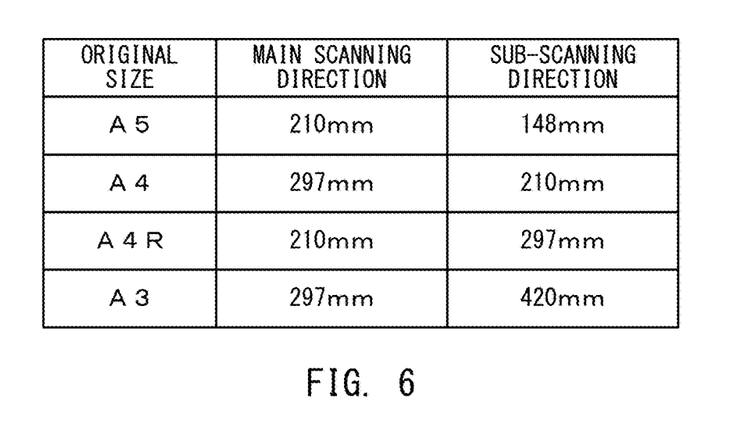
FIG. 6 is a diagram for illustrating lengths in a main scanning direction and lengths in a sub-scanning direction for each size of the original.

FIG. 5 is an explanatory diagram of a method for detecting a size of the original. FIG. 5 shows the original 132 placed on the platen 127. In the present embodiment, a size of the original of the main scanning direction is specified and a candidate of the size of the original is extracted while performing the reading operation in which the original image is read from the original placed on the platen 127. FIG. 6 is a diagram for illustrating lengths in the main scanning direction and lengths in the sub-scanning direction for each size of the original. The corner of the original 132 is not abutted against the reference position of the platen 127.

When reading the original 132 placed on the platen 127, the reading unit 119 starts the reading operation from the start position A. The reading unit 119 can perform the reading operation up to the reading position B. Upon completing the reading operation, the reading unit 119 returns to the home position. A length from the start position A to the reading position B is a distance L. The reading unit 119 performs the reading operation while moving in the direction of the arrow a (the sub-scanning direction). FIG. 5 represents a state in which the tip edge of the sub-scanning direction of the original 132 is detected when the reading unit 119 moves from the start position A to the distance X while performing a reading operation.

At a timing when the reading unit 119 reaches the distance X from the start position A, the edge extraction unit 146 extracts the edge portion of the original 132, thereby the length of the main scanning direction of the original 132 is detected. When the size of the original 132 is A4R, the length of the main scanning direction of the original 132 is 210 mm. With reference to FIG. 6, a standard original which has a length of 210 mm in the main scanning direction is either A4R or A5.

The image processing unit 102 determines the length of the main scanning direction based on the extraction result of the edge portion by the edge extraction unit 146, and determines a candidate of the size of the original based on the table shown in FIG. 6. The table shown in FIG. 6 is stored in, for example, the non-volatile memory 117, and is appropriately referred to by the image processing unit 102. For example, the image processing unit 102 determines that the length of the main scanning direction is 210 mm from the extraction result for the image portion, and determines that the size of the original 132 to be read is either A4R or A5. In this case, the original 132 is placed on the platen 127 such that the main scanning direction becomes a lateral direction.

At this point, candidates of the size of the original for the original 132 stacked on the platen 127 also include A5 size. When the size of the original is A5 size, the length of the sub-scanning direction is 148 mm. After determining the length of the main scanning direction, the image processing unit 102 determines, when the reading unit 119 has moved 148 mm from the position shown in FIG. 5, whether the edge extraction unit 146 should detect the edge (trailing edge) in the sub-scanning direction of the original. In this case, the distance which the reading unit 119 moves in the sub-scanning direction corresponds to a length in the sub-scanning direction of the candidate having the shortest length in the sub-scanning direction among the candidates of the size of the original. In a case where the trailing edge of the original is detected when the reading unit 119 has moved 148 mm, the image processing unit 102 determines that the size of the original 132 placed on the platen 127 is A5. In a case where the trailing edge is not detected, it is determined that, though the reading of the original 132 has not been completed, the size of the original is A4R. The CPU 101 obtains the detection result of the size of the original from the image processing unit 102, and at this point, it is possible to notify the control unit 260 of the image forming apparatus 202 of the size of the original. The control unit 260 of the image forming apparatus 202 determines the size of the sheet P to be fed based on the notified size of the original.

The reading unit 119 can continue the reading operation even after the size of the original is detected. That is, when the reading unit 119 moves a distance X from the start position A, the sizes of the original candidates are extracted, then, when the reading unit has further moved a length, which is a shorter length of the length in the sub-scanning direction of the size of the original of the candidate sizes, is confirmed. Even after the size of the original is confirmed, the reading unit 119 reads the image according to the size of the original, and returns to the home position when the reading is completed.

<Image Reading Processing>

Figure 7:
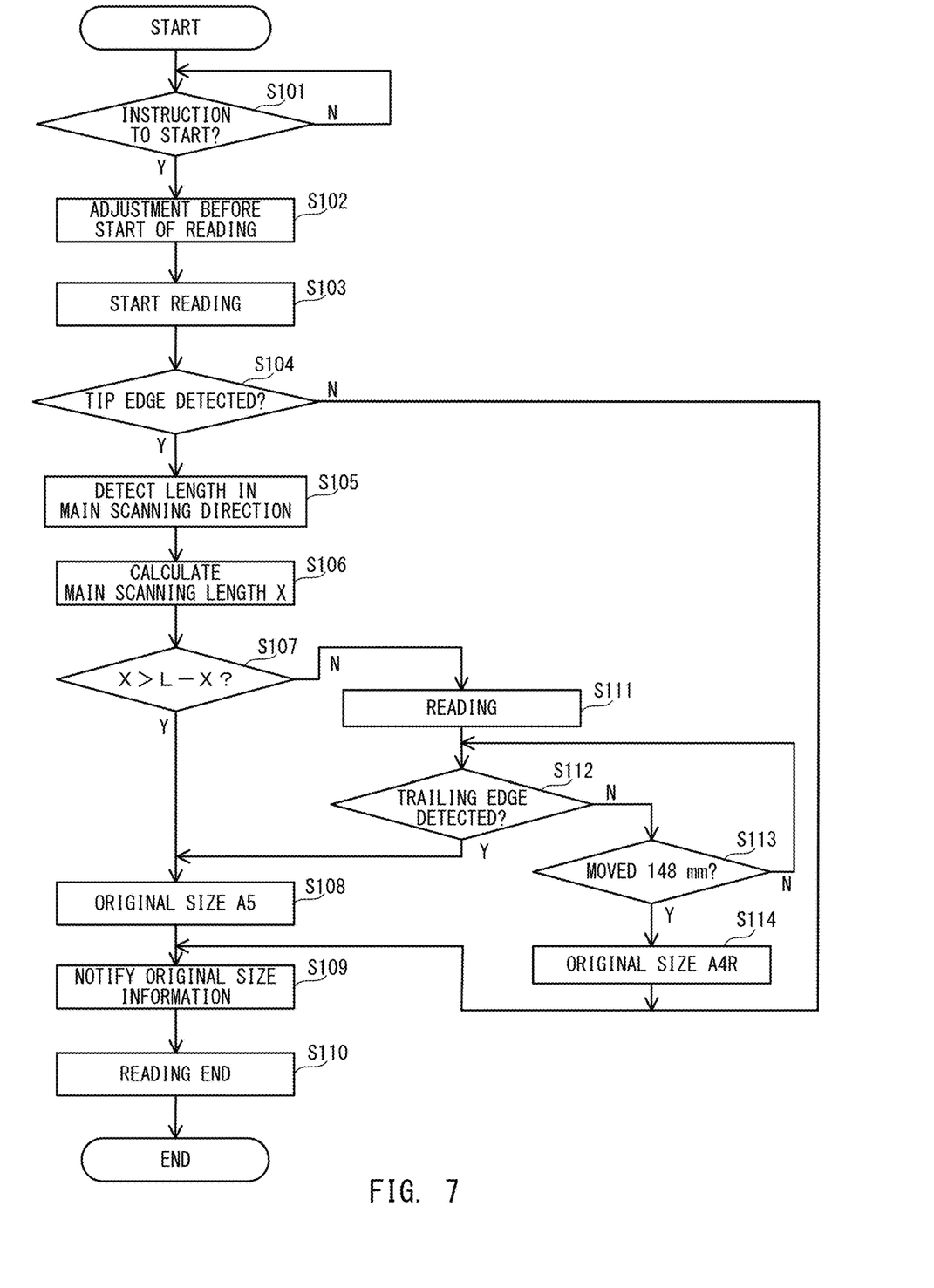
FIG. 7 is a flowchart illustrating a reading process of an original image.

FIG. 7 is a flowchart illustrating a reading process of the original image. This process is started when the start of copying the original (or the start of image reading) is instructed. A user places the original 132 on the platen 127 and instructs the operation unit 28 to start copying (or start reading an image). The instruction to start copying is received by the control unit 260 of the image forming apparatus 202. The control unit 260 instructs the CPU 101 of the image reading apparatus 201 to start reading the original in response to the instruction to start copying. Here, a case where the original 132 having A4R size is stacked will be described.

The CPU 101 determines whether or not the instruction to start reading has been received (Step S101). In a case where the instruction to start reading is received (Step S101: Y), the CPU 101 performs adjustments for the reading unit 119 before the start of reading (Step S102). For example, the CPU 101 moves the reading unit 119 to a position where it can read the shading plate 134, and performs shading. When the adjustment before the start of reading is completed, the CPU 101 starts the reading operation by the reading unit 119 (Step S103).

The CPU 101 determines whether or not the edge extraction unit 146 has detected the tip edge of the original 132 by the image processing unit 102 (Step S104). When the tip edge of the original 132 is detected (Step S104: Y), the CPU 101 detects the length of the main scanning direction of the original 132 by the image processing unit 102 (Step S105). In the present embodiment, a detected length of the main scanning direction of the original 132 is 210 mm. As a result, the image processing unit 102 determines A4R and A5 to be the candidates of the size of the original 132.

The CPU 101 calculates the distance X (scanning length X) which the reading unit 119 has moved to extract candidates for the size of the original (Step S106). In the present embodiment, the reading unit 119 is moved by driving the motor 109. The motor 109 is controlled by the motor driver 108. Therefore, the CPU 101 calculates the distance X based on the moving distance of the reading unit 119 per one pulse of the control pulse signal which is input to the motor driver 108.

Figure 8:
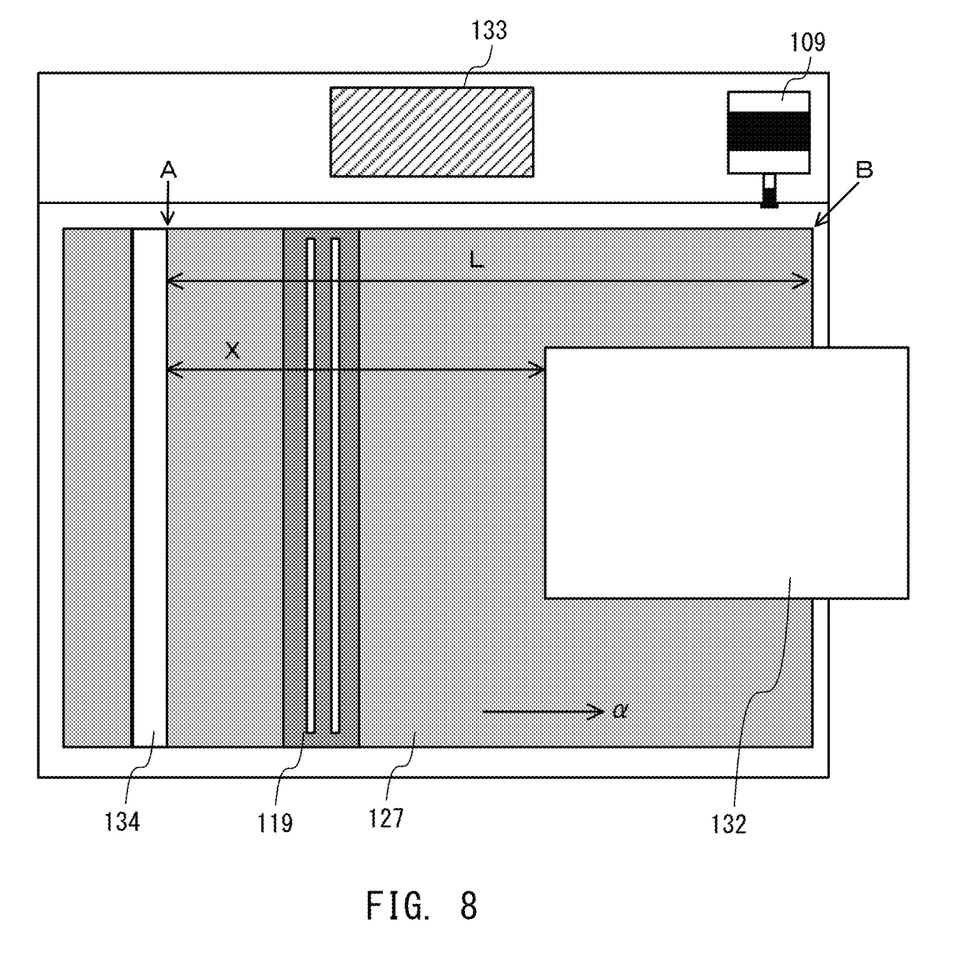
FIG. 8 is an explanatory diagram illustrating an original with its part protruding from the platen.

The CPU 101 determines whether or not the calculated distance X is longer than the difference (L-X) between the distance X and the maximum distance L which the reading unit 119 can move (X>LX) (Step S107). FIG. 8 is an explanatory diagram illustrating the original 132 with its part protruding from the platen 127. In a case where the original 132 is placed in this way, the size of the original read by the reading unit 119 is restricted. Therefore, it is determined by the processing of S107 whether or not the original 132 is placed with its part protruding from the platen 127.

When the distance X is longer than the difference between the distance X and the distance L (Step S107: Y), the CPU 101 determines that the size of the original 132 placed on the platen 127 is A5 (Step S108). When the distance X is smaller than the difference between the distance X and the distance L (Step S107: N), the CPU 101 controls the reading unit 119 to read the image while moving the reading unit by a length in the sub-scanning direction of a candidate which is a candidate having the smallest size in the sub-scanning direction among the candidates of the size of the original (Step S111). In the present embodiment, since the candidates of the size of the original are A5 and A4R, the smallest candidate for the sub-scanning direction is A5. The reading unit 119 reads an image while moving by 148 mm, which is the length of the sub-scanning direction of A5.

The CPU 101 determines whether or not the image processing unit 102 has detected the trailing edge of the original 132 based on the edge extraction result performed by the edge extraction unit 146 (Step S112). When the trailing edge of the original 132 is detected (Step S112: Y), the image processing unit 102 determines that the size of the original 132 placed on the platen 127 is A5 (Step S108).

When the rear end edge of the original 132 is not detected (Step S112: N), the CPU 101 determines whether or not the reading unit 119 has moved by 148 mm, which is the length of the sub-scanning direction of A5 (Step S113). The CPU 101 makes this determination based on the moving distance of the reading unit 119 per one pulse of the control pulse signal which is input to the motor driver 108. When the reading unit 119 has not moved by 148 mm (Step S113: N), the CPU 101 continuously determines whether or not the trailing edge of the original 132 has been detected (Step S112). When the reading unit 119 has moved by 148 mm (Step S113: Y), the image processing unit 102 determines that the size of the original 132 placed on the platen 127 is A4R, which is the largest size, among the candidates (Step S114). The CPU 101 continues reading the original image by the reading unit 119 even after the determination of the size of the original 132 has been made.

The CPU 101 notifies the control unit 260 of the image forming apparatus 202 of original size information representing the original size determined in the process of S108 or S114 (Step S109). The control unit 260 of the image forming apparatus 202 determines the size of the sheet to be fed based on the original size information. In a case where the tip edge of the original 132 is not detected (Step S104: N), there is a possibility that the original 132 is not placed on the platen 127. In this case, the CPU 101 notifies, as the original size information, the control unit 260 of the image forming apparatus 202 that the original 132 is not placed. In response to the notification, the control unit 260 displays, on a display of the operation unit 28, that the original 132 is not placed on the platen 127. With this display, the user can find that he or she has not placed the original 132 on the platen 127. When the reading of the original image of the original 132 for one sheet is completed, the CPU 101 ends the reading operation of the reading unit 119 (Step S110). As described above, the image reading apparatus 201 can detect the original size while reading the original image.

As described above, even when the original 132 is placed on the platen 127 without performing positioning, the image reading apparatus 201 can determine the size of the original 132 placed on the platen 127 more quickly than before. As a result, the image forming apparatus 202 can start the operation for copying even when the reading of the original image is not completed, therefore, high-speed copying is possible. That is, the productivity of the image forming apparatus can be further improved (or a decrease in productivity can be suppressed).

In the present embodiment, the size of the original 132 placed on the platen 127 is A4R, however, the original size is not limited to the standard original size. For example, the table shown in FIG. 6 illustrates originals having standard sizes, however, a user can register originals having non-standard sizes in this table. Further, it is possible to display information indicating a confirmed size on the display of the operation unit 28 to notify the user of the confirmed size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-111820, filed Jun. 29, 2020, which is hereby incorporated by reference herein in its entirety.

What is claimed is:

1. An image reading apparatus comprising:
a transparent member on which an original is placed;
a reading unit configured to read the original placed on the transparent member while moving in a first direction; and
at least one processor configured to detect at least one edge of the original based on a reading result by the reading unit,
wherein the at least one processor is configured to determine a candidate of a size of the original placed on the transparent member based on an edge, among the at least one detected edge, in the second direction orthogonal to the first direction,
wherein the reading unit is configured to move in the first direction by a predetermined distance based on the candidate of the determined size, and
wherein the at least one processor is configured to determine the size of the original based on whether a trailing edge in the first direction is detected or not based on the reading result read by the reading unit while moving by the predetermined distance.

2. The image reading apparatus according to claim 1,
wherein the reading unit is configured to move in the first direction by a length, which is a length in the first direction of the candidate of the size which has a shortest length in the first direction among the determined candidates of the size, and
wherein the at least one processor is configured to determine the size of the original based on whether a trailing edge in the first direction is detected or not based on the reading result read by the reading unit while moving by the length.

3. The image reading apparatus according to claim 1, wherein the at least one processor is configured to:
determine, when trailing edge of the original in the first direction is detected, that the size of the original is the size of the smallest candidate among the determined candidates of the size, and
determine, when the trailing edge of the original in the first direction is not detected, that the size of the original is the size of the largest candidate among the determined candidates of the size.

4. The image reading apparatus according to claim 1, wherein the at least one processor is configured to calculate a first distance which the reading unit has traveled before determining a tip edge of the original, and the size of the original is determined, in a case where the first distance is longer than a difference between a second distance and the first distance, to be the size of the smallest candidate among the candidates of the determined size, wherein the second distance being a maximum distance which the reading unit can travel.

5. The image reading apparatus according to claim 1, further comprising a table representing, for each size of the original, a length in the second direction and a length in the first direction,
wherein the at least one processor is configured to:
determine a length in the second direction of the original based on an extraction result of edge portions of both ends in the second direction; and
determine a candidate of the original size corresponding to the length in the second direction of the original with reference to the table.

6. The image reading apparatus according to claim 5, wherein the table represents a length in the second direction and a length in the first direction of the standard size of the original.

7. The image reading apparatus according to claim 5, wherein the table represents a length in the second direction and a length in the first direction of a size, which is registered by a user, of the original.

8. The image reading apparatus according to claim 1, wherein the at least one processor is configured to:
perform binarization processing on image data with a region containing a predetermined number of pixels in each of the second direction and the first direction as one block; and
extract the edge portion based on a result of the binarization processing.

9. The image reading apparatus according to claim 8, wherein the at least one processor is configured to perform the binarization processing based on a difference between a maximum luminance value and a minimum luminance value of the pixels included in the block.

10. The image reading apparatus according to claim 1, wherein the at least one processor is configured to store image data, in which background image thereof is removed, in a predetermined storage.

11. An image forming apparatus comprising:
an image reading apparatus including:
a transparent member on which an original is placed;
a reading unit configured to read the original placed on the transparent member while moving in a first direction,
at least one processor configured to detect at least one edge of the original based on a reading result by the reading unit,
an image forming unit configured to form an image on a sheet; and
a sheet feeding unit configured to feed the sheet to the image forming unit,
wherein the at least one processor is configured to determine a candidate of a size of the original placed on the transparent member based on an edge, among the at least one detected edge, in the second direction orthogonal to the first direction,
wherein the reading unit is configured to move in the first direction by a predetermined distance based on the candidate of the determined size, and
wherein the at least one processor is configured to determine the size of the original based on whether a trailing edge in the first direction is detected or not based on the reading result read by the reading unit while moving by the predetermined distance, wherein the sheet feeding unit feeds a sheet having a size corresponding to the size of the original detected by the image reading apparatus.

12. The image forming apparatus according to claim 11, wherein the sheet feeding unit includes a plurality of sheet feeding cassettes in which sheets of different sizes are stored,
wherein the sheet feeding unit is configured to:
determine a sheet feeding cassette in which the sheet having the size corresponding to the size of the original detected by the image reading application is to be stored; and
feed the sheet from the sheet feeding cassette.

* * * * *